United States Patent
Dalisdas et al.

(10) Patent No.: US 9,827,958 B2
(45) Date of Patent: Nov. 28, 2017

(54) SENSOR DEVICE FOR MEASURING THE ROTATIONAL SPEED AT A WHEEL OF A VEHICLE, BRAKE SYSTEM AND VEHICLE THEREWITH AND MEASURING METHOD WHICH CAN BE CARRIED OUT THEREWITH FOR MEASURING THE ROTATIONAL SPEED, AND BRAKING METHOD

(71) Applicant: WABCO GmbH, Hannover (DE)

(72) Inventors: Jurgen Dalisdas, Hannover (DE); Oliver Grundker, Wedemark (DE); Siegfried Hofler, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/405,323

(22) PCT Filed: Jun. 3, 2013

(86) PCT No.: PCT/EP2013/001617
§ 371 (c)(1),
(2) Date: Dec. 3, 2014

(87) PCT Pub. No.: WO2013/189567
PCT Pub. Date: Dec. 27, 2013

(65) Prior Publication Data
US 2015/0198623 A1      Jul. 16, 2015

(30) Foreign Application Priority Data

Jun. 21, 2012   (DE) .................. 10 2012 012 384

(51) Int. Cl.
*B60T 8/171*   (2006.01)
*B60T 8/32*   (2006.01)
(Continued)

(52) U.S. Cl.
CPC .............. *B60T 8/329* (2013.01); *B60T 8/171* (2013.01); *G01P 1/00* (2013.01); *G01P 1/026* (2013.01);
(Continued)

(58) Field of Classification Search
CPC .. G01P 1/00; G01P 1/026; G01P 3/443; G01P 3/488; G01P 3/49; B60T 8/171; B60T 8/329
(Continued)

(56) References Cited

U.S. PATENT DOCUMENTS 2,495,674 A * 1/1950 Lewis .................. F16B 2/246
                                                                                                248/410
4,076,330 A * 2/1978 Leiber .................. B60T 8/329
                                                                                              188/1.11 R
(Continued)

FOREIGN PATENT DOCUMENTS

CN    201259505 Y *  6/2009
DE       3201811 A1 *  9/1983 .............. B60T 8/171
(Continued)

OTHER PUBLICATIONS

Translation of DE 3201811 (original German document published Sep. 8, 1983).*
(Continued)

*Primary Examiner* — Behrang Badii
*Assistant Examiner* — David Testardi
(74) *Attorney, Agent, or Firm* — Warner Norcross & Judd LLP

(57) ABSTRACT

A sensor device for measuring the rotational speed at a wheel of a vehicle has a sensor carrier with an active sensor for actively sensing the rotation of a pole wheel rotating along with the wheel to measure rotational speed. The sensor carrier is constructed and arranged such that it can be
(Continued)

clamped in the region of the wheel to permit the active sensor to be used without requiring complex adjustment operations.

7 Claims, 2 Drawing Sheets

(51) Int. Cl.
  *G01P 1/02* (2006.01)
  *G01P 3/488* (2006.01)
  *G01P 1/00* (2006.01)
  *G01P 3/487* (2006.01)
  *G01P 3/49* (2006.01)

(52) U.S. Cl.
  CPC .............. *G01P 3/487* (2013.01); *G01P 3/488* (2013.01); *G01P 3/49* (2013.01)

(58) Field of Classification Search
  USPC ........................................................ 701/70
  See application file for complete search history.

(56) References Cited

U.S. PATENT DOCUMENTS

| | | | | |
|---|---|---|---|---|
| 4,612,501 | A * | 9/1986 | Costello | F16B 21/16 324/160 |
| 4,670,715 | A * | 6/1987 | Fuzzell | G01P 1/00 324/174 |
| 4,745,363 | A * | 5/1988 | Carr | F02P 7/07 324/174 |
| 4,905,507 | A * | 3/1990 | Klein | G01P 3/488 303/168 |
| 5,451,868 | A * | 9/1995 | Lock | G01P 1/04 324/166 |
| 5,561,368 | A * | 10/1996 | Dovek | G01R 33/093 324/252 |
| 5,595,410 | A * | 1/1997 | Wilson | E05C 19/008 292/259 R |
| 5,744,950 | A * | 4/1998 | Seefeldt | G01P 3/489 324/166 |
| 5,756,894 | A | 5/1998 | Paolo et al. | |
| 5,877,626 | A * | 3/1999 | Umemoto | G01V 3/08 324/207.12 |
| 5,922,953 | A * | 7/1999 | Payne | G01B 7/146 324/173 |
| 5,928,290 | A * | 7/1999 | Gramnas | A61F 2/78 292/306 |
| 5,945,825 | A * | 8/1999 | Clemens | B82Y 25/00 324/252 |
| 5,963,028 | A * | 10/1999 | Engel | G01R 33/07 174/536 |
| 6,109,102 | A * | 8/2000 | Schneider | B60T 8/171 73/488 |
| 6,339,329 | B1 * | 1/2002 | Neumann | G01R 33/09 148/108 |
| 6,498,474 | B1 * | 12/2002 | Turner | G01D 5/145 324/165 |
| 6,523,425 | B1 * | 2/2003 | Kubik | B60T 8/171 73/493 |
| 6,830,379 | B2 | 12/2004 | Morita et al. | |
| 6,838,871 | B2 * | 1/2005 | Taneyhill | G01P 1/026 324/174 |
| 7,331,240 | B2 * | 2/2008 | Beverly | B60T 8/171 73/745 |
| 7,560,918 | B2 * | 7/2009 | Gschossmann | B60T 8/171 324/160 |
| 8,120,352 | B2 * | 2/2012 | Schleyer | G01P 1/00 324/160 |
| 8,930,114 | B1 * | 1/2015 | Reid | B60T 8/323 280/204 |
| 2001/0011843 | A1 * | 8/2001 | Makilaine | B60T 8/00 303/138 |
| 2001/0030466 | A1 * | 10/2001 | Ehrlich | B60T 8/171 303/191 |
| 2002/0005780 | A1 * | 1/2002 | Ehrlich | B60T 8/171 340/453 |
| 2003/0011358 | A1 | 1/2003 | Karpinski | |
| 2004/0119465 | A1 * | 6/2004 | Clark | B60T 8/171 324/174 |
| 2004/0232906 | A1 * | 11/2004 | Taneyhill | G01D 3/028 324/179 |
| 2005/0035758 | A1 * | 2/2005 | Waszkowski | B60T 8/171 324/207.25 |
| 2006/0009901 | A1 * | 1/2006 | Pasquet | B60T 7/08 701/70 |
| 2007/0063693 | A1 * | 3/2007 | Modest | G01P 1/026 324/207.2 |
| 2008/0303513 | A1 * | 12/2008 | Turner | G01P 3/488 324/160 |
| 2009/0256552 | A1 * | 10/2009 | Guo | G01B 7/30 324/207.21 |

FOREIGN PATENT DOCUMENTS

| | | | | |
|---|---|---|---|---|
| DE | 32 29 207 | | 4/1984 | |
| DE | 4329912 | A1 * | 3/1995 | ................ G01P 1/00 |
| DE | 195 32 328 | | 3/1997 | |
| DE | 19649265 | A1 * | 6/1998 | ............ B82Y 25/00 |
| DE | 103 47 117 | | 5/2005 | |
| DE | 10 2008 054 000 | | 5/2010 | |
| DE | 10 2010 049 282 | | 4/2012 | |
| EP | 0 092 605 | | 11/1983 | |
| EP | 273481 | B1 * | 9/1992 | |
| EP | 448062 | B1 * | 2/1994 | |
| JP | 01040161 | A * | 2/1989 | |
| JP | 2002221529 | A * | 8/2002 | |
| WO | WO 9312434 | A1 * | 6/1993 | ............ G01D 5/147 |
| WO | WO 2004027433 | A1 * | 4/2004 | ............ B60T 8/171 |

OTHER PUBLICATIONS

EPO machine translation of WO 2004/027433 (original PCT document published Apr. 1, 2004).*
Wikipedia article, "Variable reluctance sensor", Old revision, dated Sep. 9, 2011, 2 pages.*
EPO machine translation of EP 448062 (original A1 European document published Sep. 25, 1991).*
Cherry, "Speed & position sensors", Document 801276; 45610414; E, published Dec. 2011, © 2011 ZF Friedrichshafen AG, 28 pages.*
Cherry, "Speed & proximity sensors", © 2000, Cherry Electrical Products, 16 pages.*
Honeywell, "LCZ series hall-effect zero speed sensors", 005886-2-EN IL50 GLO, Jun. 2008, Copyright © 2008 Honeywell International Inc., 4 pages.*
Honeywell, "SNDH-H series Hall-Effect speed sensors", 005933-2-EN, Feb. 2012, Copyright ® 2012 Honeywell International Inc., 6 pages.*
Bendix© A-18™ Trailer ABS (Service Data publication SD-13/4757), BW2262, © 2004 Bendix Commercial Vehicle Systems LLC, 40 pages.*
Bendix© WS-24™ AntiLock Wheel Speed Sensor (Service Data publication SD-13-4860), BW2364, © 2004 Bendix Commercial Vehicle Systems LLC, 4 pages.*
Infineon TLE6212 System-IC for ABS/TC/ESC, Product Brief, Rev. 1, Oct. 2008, 5 pages.*
EPO machine translation of EP 448062 (original EP B1 document published Feb. 16, 1994).*
Hella brochure, "Wheel speed sensors in motor vehicles. Function. Diagnosis. Troubleshooting.", © 2009 Hella KGaA Hueck & Co., Lippstadt, 9Z2 999 127-942 TT/06.09/0.4, 12 pages.*

* cited by examiner

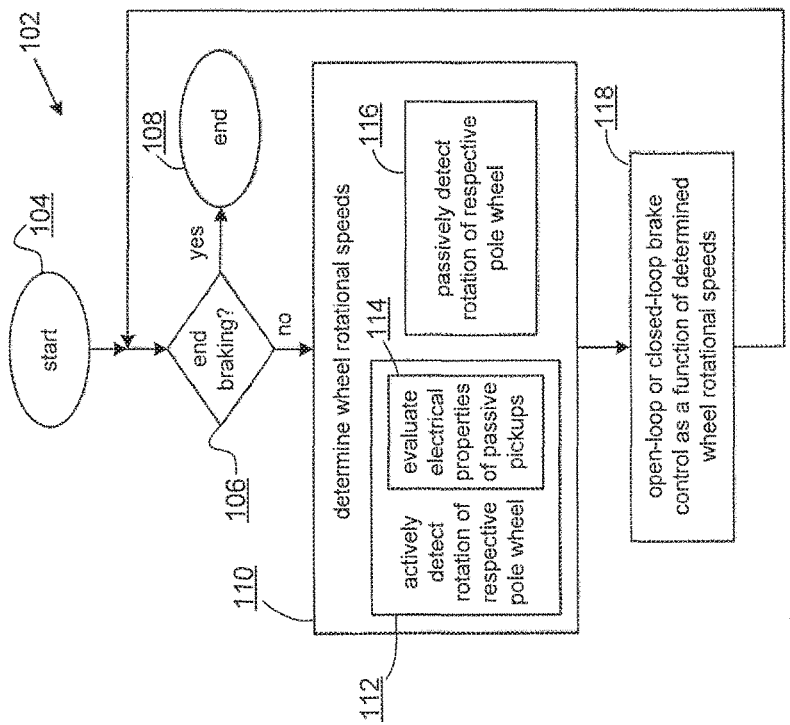
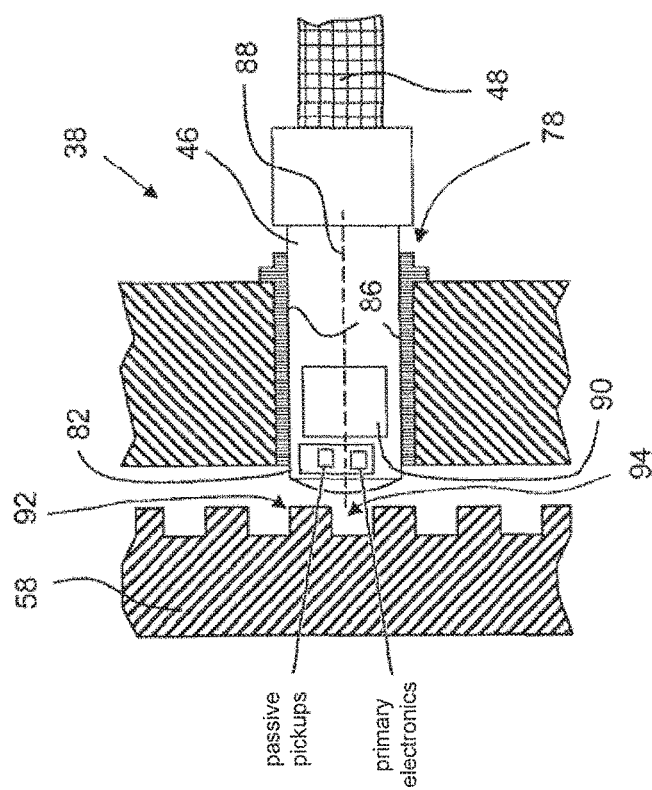

SENSOR DEVICE FOR MEASURING THE ROTATIONAL SPEED AT A WHEEL OF A VEHICLE, BRAKE SYSTEM AND VEHICLE THEREWITH AND MEASURING METHOD WHICH CAN BE CARRIED OUT THEREWITH FOR MEASURING THE ROTATIONAL SPEED, AND BRAKING METHOD

FIELD OF THE INVENTION

The present invention generally relates to sensor devices for measuring rotational speed at vehicle wheels.

BACKGROUND OF THE INVENTION

EP 0 092 605 B2, for example, describes a rod sensor that has a passive sensor for passively measuring rotational speed by means of induction in brake systems of utility vehicles. During mounting, the rod of this known rod sensor is pushed into the securing opening or through the securing opening until it makes contact with the pole wheel, and is secured in the securing opening by means of a clamping hushing. The measurement principle of the rod sensor by means of induction permits the sensor carrier to be attached in the securing opening in a positionally independent fashion in relation to rotations of the sensor carrier about the rod axis of the rod. This known rod sensor can therefore be installed without complex adjustment operations and therefore at low cost. However, it is disadvantageous that an alternating voltage, which can be measured and evaluated, is induced in the passive sensor only when the pole wheel rotates relative to the rod sensor. The amplitude of the alternating voltage is, moreover, dependent on the rotational speed of the pole wheel, with the result that low rotational speeds, which give rise to an amplitude that is insufficient for measuring the rotational speed, cannot be sensed.

A known sensor device of a different type is used in brake systems in comparatively small or lightweight vehicles, in particular passenger cars, and has an active sensor. Because of the active sensor, this sensor device can supply measured values even when the pole wheel is rotating very slowly or is stationary. However, this sensor device supplies measured values or sufficiently good and reliable measured values only when the active sensor is arranged in a very precisely defined position relative to the pole wheel during mounting. The sensor device or a sensor carrier with the active sensor is therefore fastened, for example, by means of a screw flange, and aligned precisely with respect to the pole wheel. The mounting of the sensor device therefore requires costly adjustment operations and is laborious and expensive.

SUMMARY OF THE INVENTION

Generally speaking, it is an object of the present invention to enable reliable measurement of wheel rotational speeds even in the case of a slowly rotating, wheel while providing, for simple mounting of the device necessary for this purpose, in particular without costly adjustment operations.

According to an embodiment of the present invention, an active sensor for actively sensing the rotation of a pole wheel, which rotates along with the wheel, or for measuring the rotational speed, is arranged in a sensor carrier, which is associated with the sensor device and which can be clamped in the region of the wheel in order to sense the rotation of the pole wheel. An active sensor is understood here to be a sensor that requires a supply voltage or auxiliary voltage. In contrast to a passive sensor, the active sensor cannot generate a signal without an auxiliary voltage. In particular, the active sensor has pickups and primary electronics, which require an auxiliary voltage for the evaluation of the electrical properties of the pickups, which electrical properties can change as a function of the position of the pole wheel with respect to the pickups. Active sensing is understood here to mean sensing using an auxiliary voltage.

This realizes the advantages of the known sensor device discussed above and used in utility vehicles as well as the advantages of the other known sensor device discussed above and used in passenger cars. It will be appreciated that the inventive sensor device can be mounted easily and, afterward, can reliably sense even low rotational speeds or the stationary state of the pole wheel and therefore of the assigned wheel of the vehicle. According to a measuring method according to an embodiment of the present invention, the sensor as an active sensor actively senses the rotation of the pole wheel.

The inventive embodiments have application in utility vehicles or trucks and in passenger ears. Regarding utility vehicles or trucks, existing securing devices for sensor devices with passive sensors can also continue to be used for the inventive sensor device. Expensive retrofitting or new developments in the case of the initial mounting are therefore not required. In particular, the inventive sensor device can be accommodated in the same securing opening or in a securing opening of the same type as the known sensor device with the passive sensor discussed above.

The sensor device is preferably a rod sensor, and the sensor carrier is preferably a rod. The rod sensor preferably comprises, in addition to the rod, a connecting cable connected to the rod via which the active sensor is supplied with electrical energy and via which measurement signals or measured values of the rotational speed measurement can be made available.

The sensor device can be arranged axially or radially with respect to the pole wheel. A connection of the cable to the rod is therefore preferably adapted to the axial or the radial arrangement of the rod relative to the pole wheel.

According to one embodiment, the sensor carrier or the rod can be clamped by means of a clamping bushing in the region of the wheel, in particular in the specified securing opening. The securing opening is preferably a drilled hole or is provided by means of a sensor holder. The clamping bushing permits simple mounting of the sensor device and automatic adjustment of a distance, which is not too large, from the pole wheel by a possible contact of the pole wheel with the sensor carrier by means of a bearing play of the wheel.

According to an embodiment, the sensor carrier or rod can be clamped in the region of the wheel such that it can be displaced along its sensor carrier axis or rod axis. As a result, the sensor carrier is, on the one hand, securely held; on the other hand, the sensor carrier can easily be introduced into the securing opening and can be set to a sufficient distance from the pole wheel by means of the bearing play of the wheel.

Preferably, the sensor carrier can be clamped in a positionally independent fashion in relation to rotations about the sensor carrier axis or rod axis, in particular in the securing opening, in order to sense the rotation of the pole wheel. The sensor device can therefore be plugged into the securing opening in any desired position and can consequently be mounted without a large amount of expenditure. Informative measured values are obtained independently of the position of the sensor carrier in the securing opening.

The active sensor is preferably a Hall sensor or Hall effect sensor or Hall difference sensor for sensing the rotation of the pole wheel using the Hall effect. The Hall sensor permits contact-free measurement over a measurable potential gradient, which occurs as a function of the position of the pole wheel relative to the active sensor, in particular as a function of whether a tooth of the pole wheel or a gap between two teeth is located in front of the active sensor.

According to one alternative embodiment, the active sensor is a magnetic field sensor, in particular a GMR (giant magnetoresistance) sensor. The GMR sensor utilizes the GIMR, effect, which is a quantum mechanical effect. In this context, variations of the magnetic field, which are caused by changes in position or the rotation of the pole wheel, bring about measureable changes in the electrical resistance of a structure provided for this purpose in the sensor.

Preferably, the active sensor has, in particular, three or at least three, pickups, the electrical properties of which can vary as a function of a magnetic field, at the pickups, which magnetic field can be influenced by the position of the pole wheel with respect to the pickups, and which electrical properties can be evaluated for measuring the rotational speed. Because of the pickups, a measurement is possible even when the pole wheel is stationary or rotating slowly.

Preferably, the pickups are arranged in directions that are different from one another, for the measurement of the magnetic field at different locations. In particular, in each case with respect to a first pickup, a second and a third pickup are arranged offset in directions that are different from one another compared to the first pickup, in a plane with the first pickup. In this way, differences of the magnetic field or of the magnetic flux density can be sensed completely independently of the position of the active sensor with respect to the pole wheel. A difference of the measured magnetic field or of the measured magnetic flux densities can be determined even when two of the pickups happen to be aligned unfavorably with respect to one another, with the result that it is not possible to measure a different flux density of the magnetic field by means of these pickups.

According to one embodiment, the active sensor is configured to generate a common signal from the electrical properties of the pickups that can be evaluated in order to measure rotational speed. The signal is therefore calculated and is preferably equal to the signal that would be obtained if only one differential signal were to be determined from two pickups, which are optimally aligned in their position with respect to the pole wheel or offset with respect to one another in the local direction of movement of the pole wheel.

The brake system according to embodiments of the present invention for a vehicle has the inventive sensor device. The inventive braking method correspondingly comprises an inventive measuring method for measuring rotational speed.

The brake system preferably has a plurality of brakes for braking and/or arresting wheels of the vehicle as well as a plurality of sensor devices, at least one sensor device being a sensor device according to an embodiment of the present invention. In addition, the brake system preferably has brake electronics, which are connected in a signal-transmitting fashion to the sensor devices, for performing open-loop and/or closed-loop control of the brakes while taking into account signals from the sensor device. At least one of the rod sensors is embodied according to the invention. Therefore, the rotational speed is measured at at least one wheel by means of the inventive measuring method. The present invention can therefore be used for automatic braking interventions, for example by means of an antilock brake system (ABS) or in an electronic brake system (EBS).

According to an embodiment of the brake system or of the braking method, at least one sensor device of the brake system has a passive, in particular inductive, sensor, which passively senses the rotation of the pole wheel. A mixed system composed of active and passive sensors is therefore present, which can be advantageous, in particular for reasons of cost. It may in fact be advantageous to determine the rotational speed of wheels only at individual wheels and/or axles, even at a slow speed or in the stationary state. It may be possible to dispense with measuring the rotational speeds of all the wheels, at a slow speed or in the stationary state. The speed measurement by means of the active sensor at at least one wheel in the case of a slow speed can serve, for example, to assist navigation in conjunction with a satellite-assisted navigation system in order, for example, to detect changes in location during maneuvering operations in a car park.

A vehicle according to the present invention is equipped with a sensor device according to an embodiment of the present invention.

Preferably, the vehicle has at least one first axle, in particular a front axle, with at least one first wheel, in particular a front wheel, in the region of which a sensor carrier of a sensor device according to the invention with an active sensor is arranged. In addition, the vehicle preferably has at least one second axle, in particular a rear axle, with at least one second wheel, in particular a rear wheel, in the region of which a further sensor carrier of a further sensor device with a passive sensor is arranged. It may be sufficient to measure the rotational speed of at least one wheel and therefore the vehicle velocity, which can be derived therefrom, at the first axle, while the sensor device with the passive sensor is installed at the second axle. In the case of retrofitting a vehicle that is already equipped with passive sensors, it is therefore sufficient to replace the sensor devices with the passive sensors at the first axle by sensor devices with active sensors.

Replacing a conventional sensor device with a passive sensor by a sensor device according to the invention with the active sensor is easily possible, since preferably these two sensor devices have the same or a similar shape of the respective sensor carrier and can therefore be installed as an alternative, in each case in a positionally independent fashion in the same securing opening provided for this purpose, in particular by means of the clamping device.

The passive sensor of the sensor device provided for the mixed equipping process preferably has a pickup, which can generate, from a magnetic alternating field which is present at the pickup as a result of the rotation of the pole wheel, an electrical alternating voltage that can be evaluated for measuring the rotational speed.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set thrill, and the scope of the invention will be indicated in the claims.

BRIEF DESCRIPTION OF THE DRAWINGS

The present invention is discussed in greater detail below with reference to the accompanying drawings, in which:

FIG. 2 is a sectional view showing the sensor device of the exemplary embodiment according to FIG. 1 with a sensor carrier clamped next to a pole wheel; and FIG. 3 is a block circuit diagram illustrating a braking method including a measuring method according to an exemplary embodiment of the present invention.

DETAILED DESCRIPTION OF THE PREFERRED EMBODIMENTS

Figure 1:
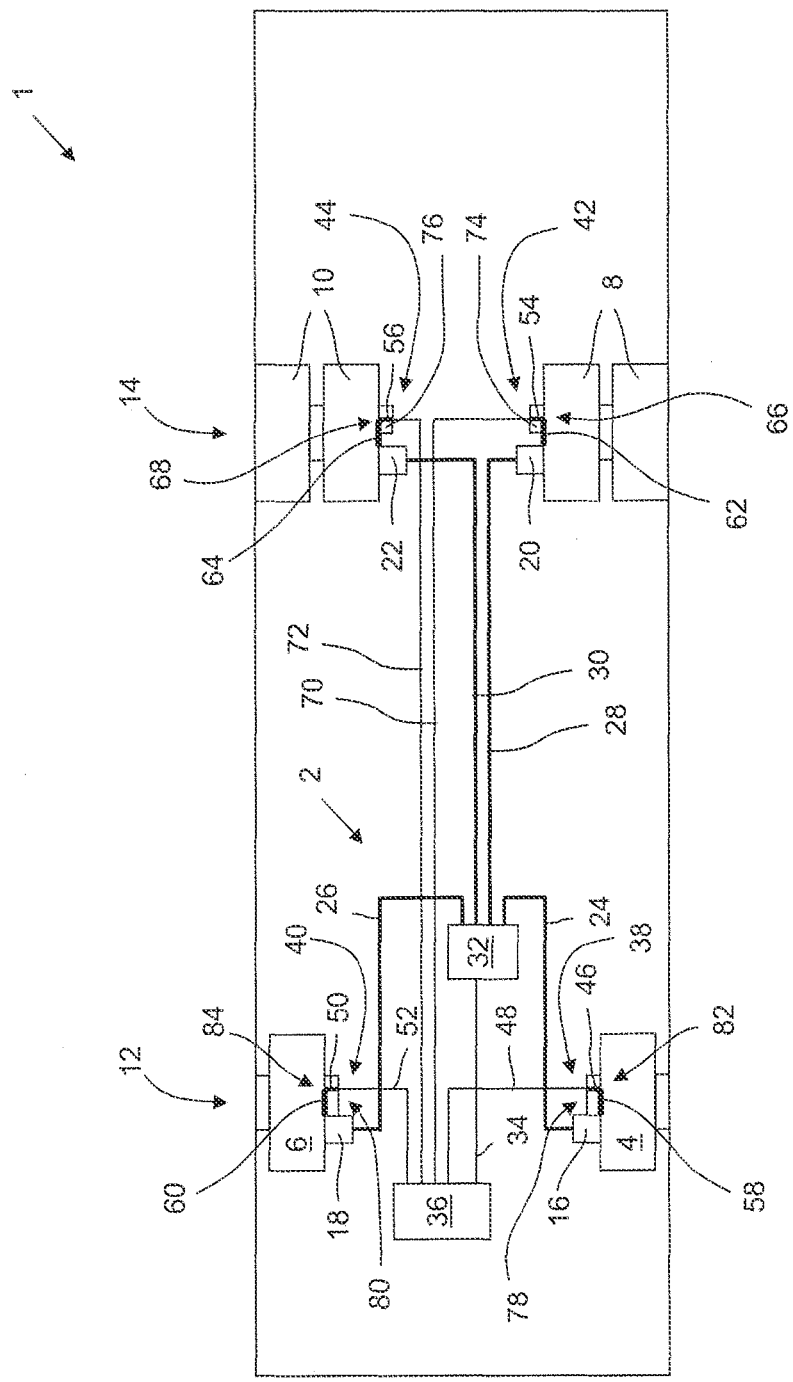
FIG. 1 shows a vehicle equipped with a brake system with sensor devices in the region of its wheels according to an exemplary embodiment of the present invention.

FIG. 1 shows a vehicle 1 according to an exemplary embodiment of the present invention. The vehicle 1 is embodied, by way of example, as a utility vehicle and as a road vehicle. In particular, the vehicle 1 is a motor vehicle that has its own drive (not illustrated) for example an internal combustion engine.

The vehicle 1 has a pneumatic brake system 2 for braking or arresting wheels 4, 6, 8 and 10 of the vehicle 1. It should be understood, however, that the present invention also has application with respect to hydraulic brake systems.

The wheel 4 is a left-hand front wheel, the wheel 6 is a right-hand front wheel, the wheel 8 is a left-hand rear wheel, which is embodied as twin tires, and the wheel 10 is a right-hand rear wheel, which is embodied as twin tires. The front wheels 4 and 6 are arranged on a first axle 14, which is a front axle, and the rear wheels 8 and 10 on a second axle 14, which is a rear axle. In order to brake or arrest the wheels 4 to 10, a first brake 16 is arranged on the left-hand front wheel 4, a second brake 18 is arranged on the right-hand front wheel 6, a third brake 20 is arranged on the left-hand rear wheel 8, and a fourth brake 22 is arranged on the right-hand rear wheel 10. The brakes 18 to 22 are connected pneumatically to a brake modulator 32 via a first compressed air line 24, a second compressed air line 26, a third compressed air line 28 and a fourth compressed air line 30.

By means of the brake modulator 32, brake pressure for the individual brakes 16 to 22 can be modulated and/or changed compared to a, for example, manually modulated brake pressure by means of electrically actuable valve devices. The brake modulator 32 is actuated for this purpose by brake electronics 36 via a control line 34. The brake electronics 36 process sensed wheel rotational speeds of the wheels 4 to 12 and take into account these wheel rotational speeds during the actuation of the brake modulator 32. In particular, the brake electronics 36 detect, for example, a tendency of one of the wheels 4 to 12 to lock, on the basis of the wheel rotational speeds, and in response thereto reduce the brake pressure at the respective wheel 4 to 12. Moreover, the sensed wheel rotational speeds of the wheels 6 to 12 can be available for further applications, for example, for improving the determination of the position of the vehicle 1 in addition to a satellite-assisted navigation system when the vehicle 1 moves in a detected direction of movement at a distance determined on the basis of the wheel rotational speeds.

For the measurement of the rotational speed, the brake system 2 has a first sensor device 38, a second sensor device 40, a third sensor device 42 and a fourth sensor device 44. The sensor devices 38 to 44 are each embodied as rod sensors. The first sensor device 38 comprises a first sensor carrier 46, which is embodied as a rod and is arranged in the region of the left-hand front wheel 4, and a first connecting cable 48, via which signals or data of the first sensor device 38 can be transmitted to the brake electronics 36. Correspondingly, the second sensor device 40 has a second sensor carrier 50, which is embodied as a rod, in the region of the right-hand front wheel 6, and a second connecting cable 52, which is connected to the brake electronics 36. A third sensor carrier 54, embodied as a rod, of the third sensor device 42 is arranged in the region of the left-hand rear wheel 8, and a fourth sensor carrier 56, embodied as a rod, of the fourth sensor device 44 is arranged in the region of the right-hand rear wheel 10.

The arrangement of the sensor carrier 46, 50, 54, 56 in the region of the wheel 4, 6, 8, 10 is to be understood as meaning an arrangement in which the distance between the respective sensor carrier 46, 50, 54, 56 and a pole wheel 58, 60, 62, 64, which is arranged at the respective wheel 4, 6, 8, 10, is at maximum 30 mm, preferably, at maximum 10 mm, more preferably, at maximum 3 mm, and even more preferably, up to 1 mm. The pole wheels 58 to 64 rotate together with the wheels, with the result that, by determining the rotational speed of the respective pole wheel 58 to 64, it is possible to infer the rotational speed of the assigned wheel 4 to 10 and therefore also a distance traveled, by means of the circumference of the respective wheel.

The pole wheels 58 to 64 have alternately elevated portions and depressions or teeth and gaps, or are toothed. In addition, the pole wheels 58 to 64 are composed of a ferromagnetic material, with the result that, by utilizing the fact that magnetic properties change as a function of the position of the pole wheel 58 to 64 with respect to the sensor carrier 46, 50, 54, 56, the position and/or a movement of the pole wheel 58 to 64 can be detected by means of the sensor device 38 to 44.

The third sensor carrier 54 of the third sensor device 42 has a first passive sensor 66, and the fourth sensor carrier 56 of the fourth sensor device 44 has a second passive sensor 68 for passive measurement of rotational speed by means of magnetic induction. Sensor signals are transmitted to the brake electronics 36 from the first passive sensor 66 via a third connecting cable 70, and from the second passive sensor 68 via a fourth connecting cable 72. The third sensor carrier 54 and the fourth sensor carrier 56 are secured in a first sensor holder 74 or second sensor holder 76, respectively, in front of a respective pole wheel 62 or 64 in the region of the rear wheel 8 or 10, and are clamped in the first sensor holder 74 or second sensor holder 76, respectively, in particular by the provision of a securing opening or a clamping device by means of the sensor holder 74, 76.

The first sensor carrier 46 and the second sensor carrier 50 are clamped in a securing opening or clamping device 78 or 80 in front of the first wheel 58 or second pole wheel 60 in the region of the left-hand front wheel 4 or right-hand front wheel 6. The first sensor carrier 46 or the second sensor carrier 50 has a first active sensor 82 or second active sensor 84. In contrast to the passive sensors 66 and 68, the active sensors 82 and 84 require, for measuring rotational speed, an auxiliary voltage, which is made available by the first connecting cable 48 or second connecting cable 52. The holes 78 and 80 could, in principle also be equipped with sensor carriers according to the third sensor carrier 54 or fourth sensor carrier 56, and therefore have passive sensors. Because of the active sensors in the sensor carriers 46 and 50, it is, however, possible also to sense lower rotational speeds, which can no longer be sensed by the passive sensors 66, 68, by means of the first sensor device 38 or second sensor device 40.

The arrangement according to FIG. 1 can be obtained by virtue of the fact that in a known vehicle or a known brake system sensor carriers with passive sensors at the front axle 12 are replaced by the sensor devices 38 and 40 with the active sensors 82 and 84 by simple exchange. The third sensor device 42 and the fourth sensor device 44 could also be replaced by alternative sensor devices with active sensors. However, the mixed equipment has cost advantages, which in many cases do not involve any decisive disadvantages since the precise determination of wheel rotational speeds at low rotational speeds is often sufficient at merely one axle, in particular the front axle 12.

FIG. 2 shows the first sensor device 38 of the exemplary embodiment according to FIG. 1 with the first sensor carrier 46 clamped in the securing opening 78 and with the first connecting cable 48, which is partially depicted. The first sensor carrier 46 or rod is clamped in the securing opening 78 by means of a clamping bushing 86 such that the first sensor carrier 46 can be pushed along a sensor carrier axis 88 into the securing opening 78 counter to a securing force until it makes contact with the first pole wheel 58, and, when first rotations of the first pole wheel 58 occur, is pushed back slightly counter to this clamping force by contact of the pole wheel 58 with the first sensor carrier 46 as a result of bearing play of the first axle 12, to which the left-hand front wheel 4 and the first pole wheel 58 are attached, with the result that the first sensor carrier 46 is subsequently secured at a distance of less than 1 mm or a distance of a few millimeters from the first pole wheel 58 by means of the clamping bushing 86.

The first sensor carrier 46 or rod can be clamped in any desired position or in a positionally independent fashion in relation to rotations about the sensor carrier axis 88 or rod axis in the securing opening 78. The first sensor carrier 46 is preferably of radially symmetrical design about the sensor carrier axis 88, in particular also tier an advantageous clamping effect by means of the clamping bushing 86. Measurement of the rotational speed by means of the first active sensor 82 is possible in all cases, with the result that costly adjustment operations can be avoided.

A magnet 90 is integrated into the first sensor carrier 46, the magnetic field of which is also influenced in the region of the first active sensor 82 by the respective position of the first pole wheel 58. In particular, the magnetic flux density in the region of the teeth, for example, in the region of a tooth 92, is increased compared to the gaps located therebetween, for example, a gap 94.

The first active sensor 82 is embodied as a Hall sensor or Hall effect sensor. In this context, the measurement of the magnetic flux density is carried out parallel to the sensor carrier axis 88 in that an electric current is conducted perpendicularly to the sensor carrier axis 88, and a potential gradient, which occurs as a result of the magnetic, field, is measured perpendicularly to the sensor carrier axis 88 and perpendicularly to the flow of electrical current.

The second sensor carrier 50 of the exemplary embodiment according to FIG. 1 is clamped in the same way in the region of the right-hand front wheel 6. The measurement of the rotational speed by means of the second active sensor 84 takes place correspondingly.

FIG. 3 illustrates an exemplary braking method 102, which starts in a step 104 and, if braking method 102 is to be ended according to an interrogation 106, ends in a step 108. Otherwise, wheel rotational speeds are determined by means of a measuring method according to a step 110. Measuring method 110 includes active sensing of the position or rotation of the respective pole wheel 58, 60, 62, 64 according to a step 112. Step 112 includes evaluation of the electrical properties of pickups according to a step 114. In addition to step 112, measuring method 110 optionally includes a step 116 according to which the rotation of a respective pole wheel is sensed in a traditional way, to be precise, passively, by means of a passive sensor. The rotation of the respective pole wheel 58, 60, 62, 64, and therefore of the assigned wheel 4, 6, 8, 10, is therefore sensed actively at at least one of the wheels 4, 6, 8, 10, and passively at at least another of the wheels 4, 6, 8, 10.

Measuring method 110 is followed by open-loop or closed-loop control of the brakes 16, 18, 20, 22 as a function of wheel rotational speeds determined by means of measuring method 110 according to a step 118. The wheel rotational speeds are continuously newly determined and used for braking method 102. Alternatively or additionally, the wheel rotational speeds are used independently of braking method 102, for example, for distance measurements, at vehicle 1.

Accordingly, the present invention permits the use of active sensors with all the advantages associated therewith in a conventional sensor adaptation at the vehicle with positionally independent alignment of the sensor with respect to the pole wheel.

It will thus be seen that the objects set forth above, among those made apparent from the preceding description, are efficiently attained, and since certain changes may be made without departing from spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for braking wheels of a vehicle utilizing a brake system, the brake system comprising: brakes; sensor devices including an active sensor and a passive sensor each providing an output, a sensor carrier associated with the active sensor, the sensor carrier being displaceable along an active sensor carrier axis, the sensor carrier including at least three pickups in plane with each other to sense rotation of a pole wheel independent of the rotational orientation of the sensor carrier about the sensor carrier axis, the sensor carrier assuming any of multiple orientations about the active sensor carrier axis during installation in a region of a first wheel of the vehicle, and configured to be clamped in a first securing opening in the region of the first wheel of the vehicle such that the active sensor actively senses the rotation of the pole wheel that rotates along with the wheel of the vehicle, the passive sensor being configured to be clamped in a second securing opening in a region of a second wheel of the vehicle, the active sensor and the passive sensor being shaped to be alternatively received within the first securing opening and the second securing opening; and brake electronics in communication with the sensor devices, the method comprising:
measuring the speed of the first wheel based on the output of the active sensor;
measuring the speed of the second wheel based on the output of the passive sensor;
using the brake electronics to perform at least one of open-loop and closed-loop control of the brakes based at least in part on the measured speed of the first wheel and the measured speed of the second wheel.

2. The braking method as claimed in claim 1, wherein the passive sensor is adapted to passively sense the rotation of a pole wheel associated with the second wheel of the vehicle.

3. The braking method as claimed in claim 2, further comprising measuring rotational speed of the first wheel of a first axle of the vehicle utilizing the active sensor, and measuring rotational speed of the second wheel of a second axle of the vehicle utilizing the passive sensor.

4. The braking method as claimed in claim 2, wherein the passive sensor is an inductive sensor.

5. A vehicle, comprising:
a brake system, the brake system including brakes;
sensor devices including:
an active sensor and a passive sensor each providing an output, and
a sensor carrier associated with the active sensor, the sensor carrier being displaceable along an active sensor carrier axis, the sensor carrier assuming any of multiple orientations about the active sensor carrier axis during installation in a region of a first wheel of the vehicle, and configured to be clamped in a first securing opening in the region of the first wheel of the vehicle, the sensor carrier including at least three pickups contained therein, the at least three pickups being in plane with each other to sense rotation of a pole wheel independent of the orientation of the sensor carrier about the active sensor carrier axis, wherein the active sensor actively senses the rotation of the pole wheel that rotates along with the first wheel of the vehicle, the passive sensor being configured to be clamped in a second securing opening in a region of a second wheel of the vehicle, the active sensor and the passive sensor being shaped to be alternatively received within the first securing opening and the second securing opening; and
brake electronics in communication with the sensor devices for measuring the speed of the first wheel based on the output of the active sensor, measuring the speed of the second wheel based on the output of the passive sensor, and performing at least one of open-loop and closed-loop control of the brakes based at least in part on the measured speed of the first wheel and the measured speed of the second wheel.

6. The vehicle as claimed in claim 5, wherein the passive sensor is configured to passively sense rotation of a pole wheel associated with the second wheel of the vehicle.

7. The vehicle as claimed in claim 6, wherein the passive sensor is an inductive sensor.

\* \* \* \* \*